United States Patent
Carpita

Patent Number: 5,388,041
Date of Patent: Feb. 7, 1995

[54] METHOD AND A CIRCUIT FOR CONTROLLING AN INVERTER TO SWITCH IN THE SLIDING MODE AND BY PWM WITH A THREE-LEVEL OUTPUT VOLTAGE

[75] Inventor: Mauro Carpita, Genoa, Italy

[73] Assignee: Ansaldo-Un'Azienda Finmeccanica S.p.A., Rome, Italy

[21] Appl. No.: 67,663

[22] Filed: May 26, 1993

[30] Foreign Application Priority Data

May 26, 1992 [IT] Italy .............. MI92A001290

[51] Int. Cl.$^6$ .............................................. H02M 3/24
[52] U.S. Cl. ............................................ 363/98; 363/17
[58] Field of Search ............. 363/17, 40, 41, 74, 363/78, 79, 95, 98, 132

[56] References Cited

U.S. PATENT DOCUMENTS

| | | | |
|---|---|---|---|
| 3,659,185 | 4/1972 | Gregorich | 321/2 |
| 4,124,885 | 11/1978 | Nordby | 363/56 |
| 4,532,583 | 7/1985 | Nemoto | 363/96 |
| 4,591,963 | 5/1986 | Retotar | 363/98 |
| 4,617,622 | 10/1986 | Fox | 363/98 |
| 4,903,184 | 2/1990 | Hirose | 363/37 |
| 4,969,079 | 11/1990 | Kiriyama et al. | 363/41 |
| 4,972,124 | 11/1990 | Powers | 315/219 |
| 5,012,400 | 4/1991 | Yasuda | 363/95 |
| 5,081,570 | 1/1992 | Chibani et al. | 363/17 |
| 5,111,377 | 5/1992 | Higasa et al. | 363/95 |
| 5,113,085 | 5/1992 | Schafer et al. | 307/239 |

FOREIGN PATENT DOCUMENTS

237943A1  7/1986  Germany ............ H02M 7/521

OTHER PUBLICATIONS

Carpita et al., "Power Conditioning System Using Sliding Mode Control", pp. 626–633, 1988, *PESC '88 Record*, Apr., vol. 2.

*Primary Examiner*—Steven L. Stephan
*Assistant Examiner*—Matthew Nguyen
*Attorney, Agent, or Firm*—Sheridan Ross & McIntosh

[57] ABSTRACT

A method of converting a DC voltage to a sinusoidal AC voltage by way of a circuit comprising a single-phase inverter in a bridge configuration is disclosed. To output a voltage to a truly sinusoidal pattern even in the presence of load variations, the method provides for control of the inverter switching using the sliding mode technique and pulse width modulation with a three-level output voltage. Also disclosed is a circuit for implementing the method.

9 Claims, 1 Drawing Sheet

METHOD AND A CIRCUIT FOR CONTROLLING AN INVERTER TO SWITCH IN THE SLIDING MODE AND BY PWM WITH A THREE-LEVEL OUTPUT VOLTAGE

FIELD OF THE INVENTION

This invention relates to circuits for converting a DC voltage to a sinusoidal AC voltage, and in particular, to a method for performing such a conversion and a circuit for implementing the method using a single-phase inverter in a bridge configuration.

BACKGROUND OF THE INVENTION

In general, the circuits for converting DC voltage to AC voltage—commonly referred to as inverters—are devices which can output a sinusoidal voltage with varying amplitude and frequency. Their operation is based on controlled switching of a DC voltage input using controlled electronic switches.

In a widely used class of inverters, the switching is performed so as to control the width of the output pulses, and it is for this reason that such devices are called PWM (Pulse Width Modulation) inverters. In these devices, in order to provide a sinusoidal output voltage at a given frequency, a sinusoidal reference signal having a desired frequency is compared with a triangular waveform. A rectangular wave voltage is obtained from the comparison which is utilized to control the inverter switches. Thus, a waveform is eventually output which consists of successive pulses at the same frequency as the reference signal and whose amplitude is equal to, or twice as great as, the value of the input DC voltage, depending on the structure of the set of switches and the control pattern thereof. This waveform, once suitably filtered, results in a sinusoidal voltage having the same frequency as the reference signal and an amplitude which is dependent on the input DC voltage.

The above-described operation scheme is based, of course, on an open-loop type of control, and is, therefore, unsuited to inverters which are to supply systems wherein the load may affect the output quantities of the inverter to any significant extent. In such cases, in fact, load variations may cause unacceptable alteration of the sinusoidal output waveform.

To obviate this drawback, a closed-loop control scheme has been proposed which operates in the so-called sliding mode. See, for instance, an article "Power conditioning system using sliding mode control" by M. Carpira, M. Marchesoni, M. Oberti and L. Puglisi, PESC '88 RECORD, April 1988.

According to that scheme, the output current and voltage from the inverter are respectively compared with a sinusoidal reference current and a sinusoidal reference voltage, and the result of the comparison, namely the error signal, is used to automatically determine the most appropriate switching sequence of the inverter switches to keep the output quantities at desired values.

The control principle of that technique can be described, in analytical terms by making reference to FIG. 1 of the accompanying drawing, which shows a diagram of a basic circuit structure comprising an inverter INV, being input a DC voltage U, a filter R, L, C, and a load Z. Normally, a transformer would be connected between the inverter output and the load which may be left out, however, of a first approximation to the circuit analysis. The equations that tie together the electric quantities in the circuit and, therefore, define the system to be controlled are the following:

$$u = Ri_t + L(di_t/dt) + v_c$$

$$i_t = i_l + i_c$$

$$i_c = C(dv_c/dt)$$

where:
 u = output voltage of the inverter (or the transformer where provided);
 R = resistance of the filter;
 L = inductance of the filter;
 C = capacitance of the filter;
 $i_c$ = current through the capacitor;
 $v_c$ = voltage across the capacitor;
 $i_t$ = current through the leg R, L;
 $i_l$ = current through the load.

Assume that the voltage $v_c$ across the capacitor and its derivative $dv_c/dt$ are state variables, take the system state vector as $x = [v_c, dv_c/dt]^T$, and assume that the voltage $v_c$ is the quantity requiring control. Notice that the derivative of the voltage across the capacitor is readily obtained from a measurement of the capacitor charge current.

The aim is to have the output quantity of the inverter-filter system, i.e. the voltage $v_c$ across the capacitor, trace as closely as possible a predetermined reference quantity (reference voltage $v_r$). This is obtained by causing the system state to follow a reference model represented by the sought voltage across the capacitor and by its derivative. Accordingly, the reference vector will be:

$$x_r = [v_r, dv_r/dt]^T$$

and the state error:

$$x_e = x_r - x = [(v_r - v_c), (dv_r/dt - dv_c/dt)]^T$$

Additionally, a switching law will be defined, e.g. a weighted mean of the state errors:

$$s(x_e) = K_1(v_r - v_c) + K_2(dv_r/dt - dv_c/dt).$$

The control quantity, that is the inverter output voltage u, is dependent on the switching law just defined, according to the following relations:

$$u = U_{max} \text{ for } s(x_e) > 0$$

$$u = U_{min} \text{ for } s(x_e) < 0$$

where, $U_{max}$ and $U_{min}$ are the maximum and minimum values of the input voltage U, namely $+U$ and 0 if U is a single-pole DC voltage.

Of special importance becomes, therefore, the relation:

$$s(x_e) = 0$$

In the state space, this equation can be represented by a straight line (switching line). If the control quantity u switches between $U_{max}$ and $U_{min}$ continuously, then the system is said to be operating in the sliding mode, i.e. the error $x_e$ will trace the switching straight line. From the above equation, there also must be:

$$d/dt[s(x_e)] = 0$$

By substituting the system equations in the latter and solving for the control quantity, the equivalent control quantity $u_{eq}$ is obtained. This is defined as the instant value of the quantity that should be input to the system to get the desired output.

The condition for the sliding mode to exist is expressed by the relation, $$U_{max} < u_{eq} < U_{min}$$

That is, the equivalent control quantity should never fall outside the limiting values of $U_{max}$ and $U_{min}$. Should this occur, the system would evolve freely in the state space along paths dictated by the system own characteristics, until it crosses the straight line of existence of the sliding mode. Since $x_e$ represents the state error, the system operation point sought will correspond to the condition $x_e = 0$.

The control technique just expressed can provide systems with excellent dynamic response features and low sensitivity to changes in the construction parameters and to noise.

According to the foregoing theoretical discussion, in a sliding mode condition, the system would switch at infinite frequency. In pratice, however, the switching frequency would be a finite one, due to physical limitations of the inverter switches. Of course, the system would the closer approach ideal conditions, the higher is the switching frequency. To take said physical limitations into due account, a delay must be introduced in the system, such as by connecting a hysteresis comparator in the feedback loop which would set a tolerance range for the values of the control quantity.

SUMMARY OF THE INVENTION

It is an object of this invention to provide a method whereby one can make best use of the advantageous features of the sliding mode technique.

This object is achieved, according to the invention, by controlling the inverter to switch in the sliding mode, and by pulse width modulation with a three-level output voltage.

A further object of the invention is to provide a circuit for implementing the method.

This further object is achieved by a circuit as defined and characterized in the appended claims to this specification.

BRIEF DESCRIPTION OF THE DRAWINGS

The invention can be better understood by making reference to the following detailed description of an exemplary, and hence in no way limitative, embodiment thereof, to be taken in conjunction with the accompanying drawing, in which.

DETAILED DESCRIPTION OF THE DRAWINGS

Figure 1:
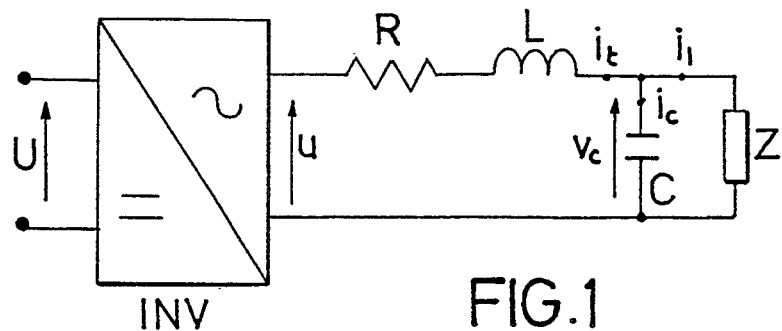
FIG. 1, already described hereinabove, shows a diagram of a circuit structure useful to explain the sliding mode control technique.
Figure 2:
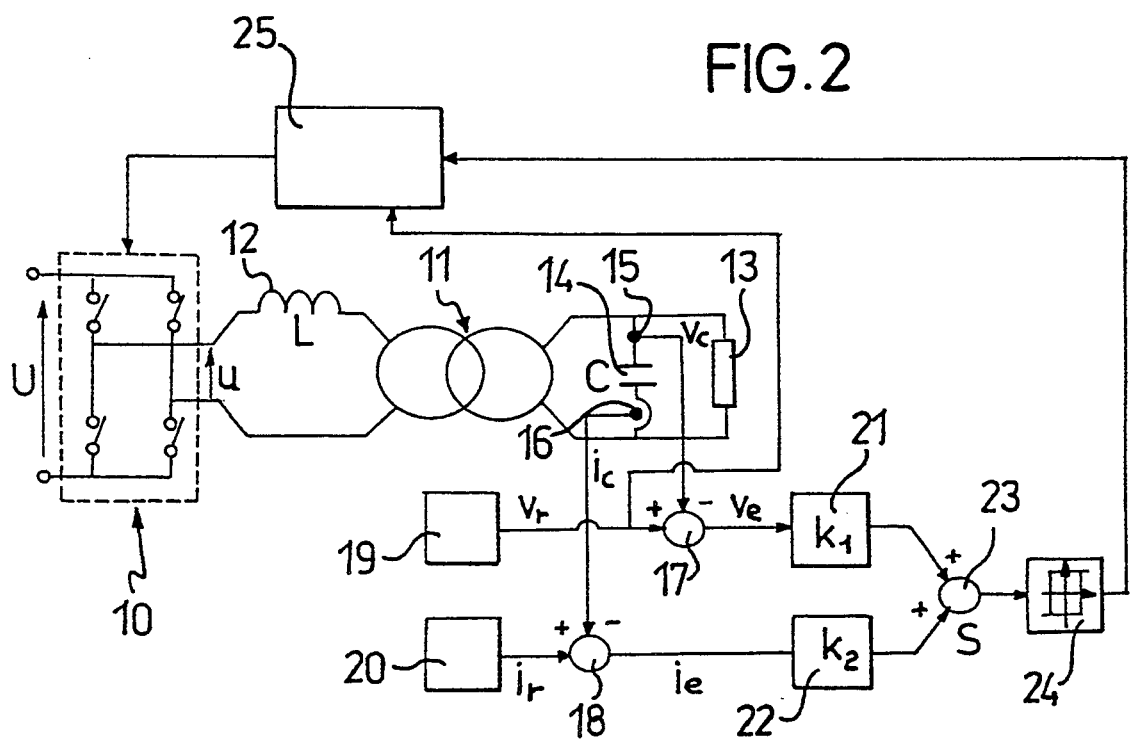
FIG. 2 is a circuit diagram, substantially in block form, embodying the principle of this invention.

With reference to FIG. 2, a bridge-configuration single-phase inverter generally shown at 10 is connected at the input end to a DC voltage source, not shown, and at the output end, to the primary winding of a transformer 11 via a coil 12 having an inductance L. The secondary winding of the transformer 11 is connected to a load 13 in parallel with a capacitor 14 having a capacitance C. The voltage $v_c$ across the capacitor 14 and the capacitor charge current $i_c = dv_c/dt$, which represents the output state x of the circuit, are sensed by specially provided sensors 15 and 16 and compared, in a voltage comparator 17 and a circuit node 18, respectively, with a reference voltage $v_r$ and a reference voltage $i_r$ generated by specially provided sinusoidal voltage and current sources 19 and 20.

The output of the comparator 17 and the output of the node 18, whereat the resultant signals from the comparison would be present—i.e. the state error signals $v_e$ and $i_e$, briefly $x_e$—are respectively connected to an amplifier 21 having a gain $K_1$, and to an amplifier 22 having a gain $K_2$. The outputs of the amplifiers 21 and 22 are connected to an adder 23 operative to so combine the amplifier output signals as to output a signal representing a weighted mean of the state errors $s(x_e)$. The output of the adder 23 is connected to the input of a hysteresis comparator 24 whose output is connected to a logic control circuit 25, in turn connected to a control input of the inverter 10 for controlling the switches to break and make. The logic circuit 25 also has an input connected to the output of the reference voltage source 19.

In operation, the output signal $s(x_e)$ from the adder 23 controls the hysteresis comparator 24 to supply the logic circuit 25 with a logic signal at a first level, if $s(x_e)$ is greater than zero, and at a second level if $s(x_e)$ is smaller than zero. The logic circuit is implemented, in accordance with well known conventional techniques, through a sequential network whereby the inverter switches are controlled in combination and succession to have the output u of the inverter satisfy the following conditions:

$$u = U_{max} \text{ if } s(x_e) > 0 \text{ and } V_{ref} > 0$$

$$u = 0 \text{ if } s(x_e) < 0 \text{ and } V_{ref} > 0$$

$$u = 0 \text{ if } s(x_e) > 0 \text{ and } V_{ref} < 0$$

$$u = U_{min} \text{ if } s(x_e) < 0 \text{ and } V_{ref} < 0$$

where, $U_{max}$ and $U_{min}$ are voltage values substantially equal in absolute value to the DC voltage U at the inverter 10 input and having a positive and negative sign, respectively. In addition, the logic circuit 25 is arranged to optimize the switching sequence by also utilizing the two different states which enable a null voltage to be output.

In a variant of the invention, rather than having the reference voltage $v_r$ input to the logic circuit 25, a sinusoidal voltage is applied to the circuit 25 which is obtained from the instant voltage on the capacitor 14 by shifting the voltage phase of the latter by a value to be obtained by measuring the current flowing through the inductance 12 and taking into account the value of this inductance. This sinusoidal voltage may be defined as the equivalent control quantity $u_{eq}$, that is the instant value of that quantity which when input to the system yields the desired inverter output u.

In this case, the control of the inverter 10 by the logic circuit 25 will be such as to satisfy the following conditions for the inverter output u:

$$u = U_{max} \text{ if } s(x_e) > 0 \text{ and } u_{eq} > 0$$

$u = 0$ if $s(x_e) < 0$ and $u_{eq} > 0$ $u = 0$ if $s(x_e) > 0$ and $u_{eq} < 0$ $u = U_{min}$ if $s(x_e) < 0$ and $u_{eq} < 0$ According to this variant of the invention, the sinusoidal output voltage can be obtained with greater accuracy, but at the expense of increased constructional complexity because the voltage $u_{eq}$ must be measured or estimated, and additionally, the fact should not be overlooked that when the system comes out of the sliding control mode, the voltage $u_{eq}$ will be undefined.

For this reason, the embodiment of the invention previously described in connection with FIG. 2 is in many cases preferable, from a practical standpoint, because it involves no special measurements and circuits. This solution may be used to advantage in all those cases where the voltage drop across the inductance 12 can be regarded as negligible. Exactly how this approximation can affect the system performance is a matter for computation at the designing stage. In actual practice, the approximation would only carry weight during the period while the sign of $u_{eq}$ differs from that of $v_r$, that is in a neighbourhood of null value of the sinusoid, whereby the amount of distortion introduced in the output waveform u would be minimal all the same.

As can be appreciated from the foregoing considerations, the inverter is controlled in the sliding mode as a result of the comparison of the output state with a reference quantity and of the definition of a switching law which is dependent on the state error, and is PWM controlled with a three-level output voltage by using amplitude and phase information on the output signal obtained either through the equivalent control voltage $u_{eq}$ or the reference voltage $v_r$. Accordingly, with the method and the circuit of this invention, the advantages afforded by the sliding mode technique—i.e. improved insensitiveness to load variations—and the advantages of three-level PWM switching—i.e. a halved switching frequency of the inverter switches for a given frequency of the output voltage—can be secured at one time.

While a single embodiment and a single variant of the invention have been described and illustrated, it is understood that many more variants are possible within the scope of this inventive concept. As an example, to provide an indication of the state of the circuit, instead of using electrical quantities sensed at the circuit output, electrical quantities sensed at some other location in the circuit could be used, or alternatively, instead of sensing two electrical quantities, it would be possible to sense just one of them, e.g. the voltage across the capacitor, and to obtain another quantity from the sensed one, e.g. a current as the derivative of the voltage across the capacitor with respect to time. Furthermore, a criterion other than the weighted mean of the state errors could be selected, as may suit the characteristics of the components used for the inverter and the whole circuit structure, or, instead of the hysteresis comparator, some other circuitry could be used to introduce a predetermined delay in the switching control of the inverter switches. Of course, the transformer could be omitted in those instances where no different maximum amplitude of the output voltage from the input voltage is required, or where no galvanic uncoupling is required.

I claim:

1. A method of converting a DC voltage to a sinusoidal AC voltage using a circuit which comprises a single-phase inverter in a bridge configuration, comprising the steps of:
   controlling the inverter to switch in accordance with a sliding mode technique;
   controlling the inverter by pulse width modulation; and
   providing a three-level output voltage based on said steps of controlling;
   wherein the sliding mode technique comprises a closed-loop inverter control process involving a comparison of an inverter output circuit quantity to a reference signal, and a resulting error signal being used to control switching of inverter switches;
   wherein the three-level output voltage is an output voltage from the inverter which outputs voltages respectively equal to the DC input voltage, the negative of the DC input voltage, and a null voltage under certain conditions.

2. A method according to claim 1, wherein said step of controlling the inverter to switch in accordance with a sliding mode technique comprises the steps of:
   generating at least one sinusoidal reference signal;
   sensing at least one electrical quantity of the circuit to obtain a circuit state signal indicating a state of the circuit;
   comparing the circuit state signal with the reference signal to obtain a state error signal indicative of a state error;
   defining a switching law dependent on the state error; and
   generating a sinusoidal quantity having predetermined amplitude and phase with respect to the circuit state signal;
   wherein the step of controlling the inverter by pulse width modulation comprises the steps of:
   applying, to an input of the inverter, switching signals effective to satisfy the following conditions for output voltage, u, of the inverter:

$u = U_{max}$ if $s(x_e) > 0$ and $u_{eq} > 0$ $u = 0$ if $s(x_e) < 0$ and $u_{eq} > 0$ $u = 0$ if $s(x_e) > 0$ and $u_{eq} < 0$ $u = U_{min}$ if $s(x_e) < 0$ and $u_{eq} < 0$ where $U_{max}$ and $U_{min}$ are voltage values substantially equal in absolute value to the DC voltage to be converted and carry positive and negative signs, respectively, $s(x_e)$ is the switching law and $u_{eq}$ is the sinusoidal quantity.

3. A method according to claim 1, wherein said step of controlling the inverter to switch in accordance with a sliding mode technique comprises the steps of:
   generating at least one sinusoidal reference signal comprising a reference voltage;
   sensing at least one electrical quantity of the circuit to obtain a circuit state signal indicating a state of the circuit;
   comparing the circuit state signal with the reference signal to obtain a state error signal indicative of a state error; and defining a switching law dependent on the state error; wherein the step of controlling the inverter by pulse width modulation comprises the steps of:

applying, to an input of the inverter, switching signals effective to satisfy the following conditions for an output voltage, u, of the inverter:

$u = U_{max}$ if $s(x_e) > 0$ and $v_r > 0$ $u = 0$ if $s(x_e) < 0$ and $v_r > 0$ $u = 0$ if $s(x_e) > 0$ and $v_r < 0$ $u = U_{min}$ if $s(x_e) < 0$ and $v_r < 0$ where $v_r$ is the value of said reference voltage, $U_{max}$ and $U_{min}$ are voltage values equal in absolute value to the DC voltage to be converted and carrying positive and negative signs, respectively, and $s(x_e)$ is the switching law.

4. A method according to claim 2, wherein, as the switching law, a weighted mean of state errors is selected.

5. A method according to claim 3, wherein, as the switching law, a weighted mean of state errors is selected.

6. A circuit for converting a DC voltage to a sinusoidal AC voltage, comprising: a single-phase inverter in a bridge configuration, wherein it further comprises:

means for generating at least one sinusoidal reference signal;

means for sensing at least one electrical quantity of the circuit to obtain a circuit state signal indicating a state of the circuit;

means operative to compare the circuit state signal with the reference signal to generate a state error signal indicative of a state error;

means for defining a switching law dependent on the state error;

means for generating a sinusoidal quantity having predetermined amplitude and phase with respect to the circuit state signal; and means for controlling the inverter to switch so as to satisfy the following conditions for an output voltage, u, of the inverter:

$u = U_{max}$ if $s(x_e) > 0$ and $u_{eq} > 0$ $u = 0$ if $s(x_e) < 0$ and $u_{eq} > 0$ $u = 0$ if $s(x_e) > 0$ and $u_{eq} < 0$ $u = U_{min}$ if $s(x_e) < 0$ and $u_{eq} < 0$ where $U_{max}$ and $U_{min}$ are voltage values substantially equal in absolute value to the DC voltage to be converted and carrying positive and negative signs, respectively, $s(x_e)$ is the switching law and $U_{eq}$ is the sinusoidal quantity.

7. A circuit for converting a DC voltage to a sinusoidal voltage, comprising a single-phase inverter in a bridge configuration, wherein it further comprises:

means for generating at least one sinusoidal reference signal comprising a reference voltage;

means for sensing at least one electrical quantity of the circuit to obtain a circuit state signal indicating a state of the circuit;

means operative to compare the circuit state signal with the reference signal so as to generate a state error signal indicative of a state error;

means for defining a switching law dependent on the state error; and means for controlling the inverter to switch so as to satisfy the following conditions for an output voltage, u, of the inverter:

$u = U_{max}$ if $s(x_e) > 0$ and $v_r > 0$ $u = 0$ if $s(x_e) < 0$ and $v_r > 0$ $u = 0$ if $s(x_e) > 0$ and $v_r < 0$ $u = U_{min}$ if $s(x_e) < 0$ End $v_r < 0$ where $v_r$ is the value of said reference voltage, $U_{max}$ and $U_{min}$ are voltage values equal in absolute value to the DC voltage to be converted and carrying positive and negative signs, respectively, and $s(x_e)$ is the switching law.

8. A circuit according to claim 7, wherein the means for generating a reference signal comprises a reference voltage source and a reference current source;

means for sensing at least one electrical quantity of the circuit comprises a voltage sensor and a current sensor effective to supply, as the circuit state signal, a voltage value and a current value, respectively;

means operative to compare the circuit state signal with the reference signal comprises a voltage comparator and a circuit node effective to respectively compare the sensed voltage with the reference voltage and the sensed current with the reference current to generate, as the state error signal, an error voltage and an error current;

means for defining a switching law comprises first and second amplifiers having respective inputs connected to an output of the voltage comparator and to an output of the circuit node, respectively, and an adder being input the outputs of the amplifiers to in turn output a corresponding quantity to the weighted mean of the error voltage and current; and means for controlling the inverter to switch comprises a logic circuit having a first input coupled to the adder output, a second input connected to the output of the reference voltage source, and an output connected to a control input of the inverter.

9. A circuit according to claim 8, wherein a hysteresis comparator is connected between the adder output and the first input of the logic circuit.

* * * * *